United States Patent [19]

Otsuka

[11] Patent Number: 5,579,126
[45] Date of Patent: Nov. 26, 1996

[54] FACSIMILE APPARATUS SERVING AS LAN SERVER ON LOCAL AREA NETWORK

[75] Inventor: Takao Otsuka, Atsugi, Japan

[73] Assignee: Ricoh Company, Ltd., Tokyo, Japan

[21] Appl. No.: 252,649

[22] Filed: Jun. 1, 1994

[30] Foreign Application Priority Data

Jun. 2, 1993 [JP] Japan .................................. 5-154604
Jun. 2, 1993 [JP] Japan .................................. 5-154605

[51] Int. Cl.$^6$ .................................................. H04N 1/32
[52] U.S. Cl. ........................... 358/403; 358/404; 358/405
[58] Field of Search .................................. 358/400, 402,
358/404, 438–440, 442, 444, 468, 405,
403; 379/100; 370/110.1, 94.1; H04N 1/00,
1/32

[56] References Cited

U.S. PATENT DOCUMENTS

| | | | |
|---|---|---|---|
| 4,432,020 | 2/1984 | Onose et al. | 379/100 |
| 5,057,935 | 10/1991 | Williams et al. | 358/402 |
| 5,230,628 | 7/1993 | Kaneko et al. | 358/400 |
| 5,267,047 | 11/1993 | Argenta et al. | 358/400 |
| 5,280,366 | 1/1994 | Araki | 358/453 |
| 5,283,665 | 2/1994 | Ogata | 358/402 |
| 5,396,341 | 3/1995 | Takahashi et al. | 358/400 |

*Primary Examiner*—Kim Vu
*Attorney, Agent, or Firm*—Lowe, Price, LeBlanc & Becker

[57] ABSTRACT

A facsimile apparatus includes: a user record storage unit for storing user record lists, each of which includes a user name record and an authorization attribute record; a transmission record storage unit for storing first transmission result record lists for document files of specified users, each of the first transmission result record lists being a set of first records with respect to one of the specified users, at least one of the first records being a user name identifying a specified user, and for storing second transmission result record lists for document files of unspecified users, each of the second transmission result record lists being a set of second records with respect to one of the unspecified users; and a control unit, responsive to a retrieval request from a first user on one of the stations, for producing a collective list containing the first records for the first user stored in the transmission record storage unit and containing the second records for all the unspecified users stored therein, and for transmitting the collective list to the above one of the stations, and for displaying the collective list on the above station.

15 Claims, 14 Drawing Sheets

FIG.3A

| USER NAME |
| --- |
| PASSWORD |
| AUTHORIZE ATTRIBUTE |
| LOG-OUT RECORD |

FIG.3B

| SPECIFIED USER LISTS |
| --- |
| UNSPECIFIED USER LISTS |

FIG.3C

| FILE NO. |
| --- |
| NO. OF PAGES |
| DATE/TIME |
| REQUIRED TIME |
| CHARGE AMOUNT |
| USER NAME |
| DESTINATION TERMINAL LIST |
| TRANSMISSION MODE |
| TRANSMISSION RESULT |
| DELETION FLAG |

FIG.3D

| FILE NO. |
| --- |
| NO. OF PAGES |
| DATE/TIME |
| REQUIRED TIME |
| CHARGE AMOUNT |
| DESTINATION TERMINAL LIST |
| TRANSMISSION MODE |
| TRANSMISSION RESULT |
| DELETION FLAG |

FIG.3E

| ERROR CODE |
| --- |
| OPERATION GUIDANCE DATA |

FIG. 11A

| USER NAME |
|---|
| PASSWORD |
| AUTHORIZE ATTRIBUTE |
| PREVIOUS LOG-OUT RECORD |

FIG. 11B

| PRINT-OUT RECORD LISTS |
|---|

FIG. 11C

| FILE NAME |
|---|
| NO. OF PAGES |
| DATE / TIME |
| USER NAME |
| PRINT-OUT RESULT |
| ERROR CODE |

FIG. 11D

| FILE NAME # 1 |
|---|
| FILE NAME # 2 |
| ⋮ |
| FILE NAME # m |

FIG. 11E

| ERROR CODE |
|---|
| OPERATION GUIDANCE DATA |

FACSIMILE APPARATUS SERVING AS LAN SERVER ON LOCAL AREA NETWORK

BACKGROUND OF THE INVENTION

The present invention generally relates to a facsimile apparatus, and more particularly to a facsimile apparatus which is linked to a local area network including two or more personal computers and operates on the local area network as a facsimile server.

A facsimile apparatus having facsimile server functions has been developed and put into practical use. The known apparatus can operate as a facsimile server on a local area network (LAN) to which a plurality of personal computers are linked. The facsimile apparatus is provided with a scanner, a plotter, and document transmission capabilities. Any user on the plurality of personal computers in the LAN can transmit and receive data through the facsimile apparatus by using the scanner, the plotter, and the document transmission capabilities. Therefore, the network resources can be efficiently used by utilizing the facsimile apparatus.

The facsimile apparatus mentioned above manages the transmission result records. The transmission result records list previous transmission results of the facsimile apparatus from transmitting stations and to reception stations via telephone lines. However, in order to arrange a transmission record list for each of the users on the personal computers on the LAN, it is necessary to output a transmission record list on the facsimile apparatus and search for the relevant items in the transmission record list. This is time consuming and inconvenient to the users on personal computers at remote locations.

In addition, after a document is transmitted by a user from one personal computer, it is necessary that the user goes to the facsimile apparatus and confirms the completion of the transmission on the facsimile apparatus. This is also inconvenient to the users. In addition, when the facsimile apparatus stops operating due to a paper end or a paper jam, such a state of the facsimile apparatus is not notified to the users on the personal computers. The users on the personal computers in the LAN cannot receive data from external stations via the transmission apparatus and cannot transmit data to external stations until the problem is eliminated and the facsimile apparatus returns to a normal operating state.

SUMMARY OF THE INVENTION

Accordingly, it is a general object of the present invention to provide an improved facsimile apparatus in which the above described problems are eliminated.

Another, more specific object of the present invention is to provide a facsimile apparatus which is linked to a local area network, including a plurality of personal computers, as a facsimile server, and allows the users on the personal computers to efficiently use the facsimile server functions of the facsimile apparatus.

The above mentioned objects of the present invention are achieved by a facsimile apparatus, linked to a local area network including a plurality of stations and operates as a facsimile server on the local area network, which includes: a facsimile unit for transmitting a document file to a communication line in response to a transmission request from one of the stations of the local area network, and for receiving a document file, addressed to one of the stations, from the communication line; a user record storage unit for storing user record lists, each of which includes a user name record, a password record, and an authorization attribute record, the user name record identifying a user who has performed a log-in procedure on one of the stations, and the authorization attribute record indicating whether or not the user is an authorized operator; a transmission record storage unit for storing first transmission result record lists for document files of specified users received or transmitted by the facsimile unit, each of the first transmission result record lists being a set of first records with respect to one of the specified users, at least one of the first records being a user name identifying a specified user, and for storing second transmission result record lists for document files of unspecified users received or transmitted by the facsimile unit, each of the second transmission result record lists being a set of second records with respect to one of the unspecified users; and a control unit, responsive to a retrieval request from a first user on one of the stations, for producing a collective list containing the first records for at least the first user stored in the transmission record storage unit and containing the second records for all the unspecified users stored therein, and for transmitting the produced collective list to the above one of the stations, on which the retrieval request has been issued by the first user, and for displaying the collective list on the above one of the stations.

Still another object of the present invention is to provide a facsimile apparatus which is linked to a local area network including a plurality of personal computers as a print server, and allows the users on the personal computers to efficiently use the print server functions of the facsimile apparatus.

The above mentioned objects of the present invention are achieved by a facsimile apparatus, linked to a local area network including a plurality of stations and operates as a print server on the local area network, which comprises: a printing unit for printing a number of document files, whose file names are added to a file name list, in the order of print requests issued from the plurality of stations; a user record storage unit for storing user record lists, each of which includes a user name record and an authorization attribute record, the user name record identifying a user who has performed a log-in procedure on one of the stations, and the authorization attribute record indicating whether or not the user is an authorized operator; a print-out record storage unit for storing print-out record lists for document files, received from the stations, each of the print-out record lists being a set of print-out records with respect to one of the document files, at least one of the print-out records being a user name identifying a user on one of the stations; and a control unit, responsive to a retrieval request from a first user on one of the stations, for producing a collective list containing the print-out records for the first user stored in the print-out record storage unit, and for transmitting the produced collective list to the above one of the stations, on which the retrieval request has been issued by the first user, and for displaying the collective list on the above one of the stations.

According to the present invention, it is possible that the users on the plurality of personal computers in a local area network system efficiently manage the transmission result records of the facsimile apparatus. In addition, the users on the personal computers can efficiently use the facsimile server functions of the facsimile apparatus by utilizing user management data. In addition, the users on the personal computers can efficiently use the print server functions of the facsimile apparatus by utilizing user management data.

BRIEF DESCRIPTION OF THE DRAWINGS

The above and other objects, features and advantages of the present invention will be more apparent from the following detailed description when read in conjunction with the accompanying drawings in which:

FIGS. 3A through 3E are diagrams showing lists of user management data used by a first embodiment of the facsimile apparatus according to the present invention;

FIGS. 11A through 11E are diagrams showing lists of user management data used by a second embodiment of the facsimile apparatus according to the present invention;

DESCRIPTION OF THE PREFERRED EMBODIMENTS

A description will now be given, with reference to FIGS. 1 and 2, of a local area network system to which the present invention is applied.

Figure 1:
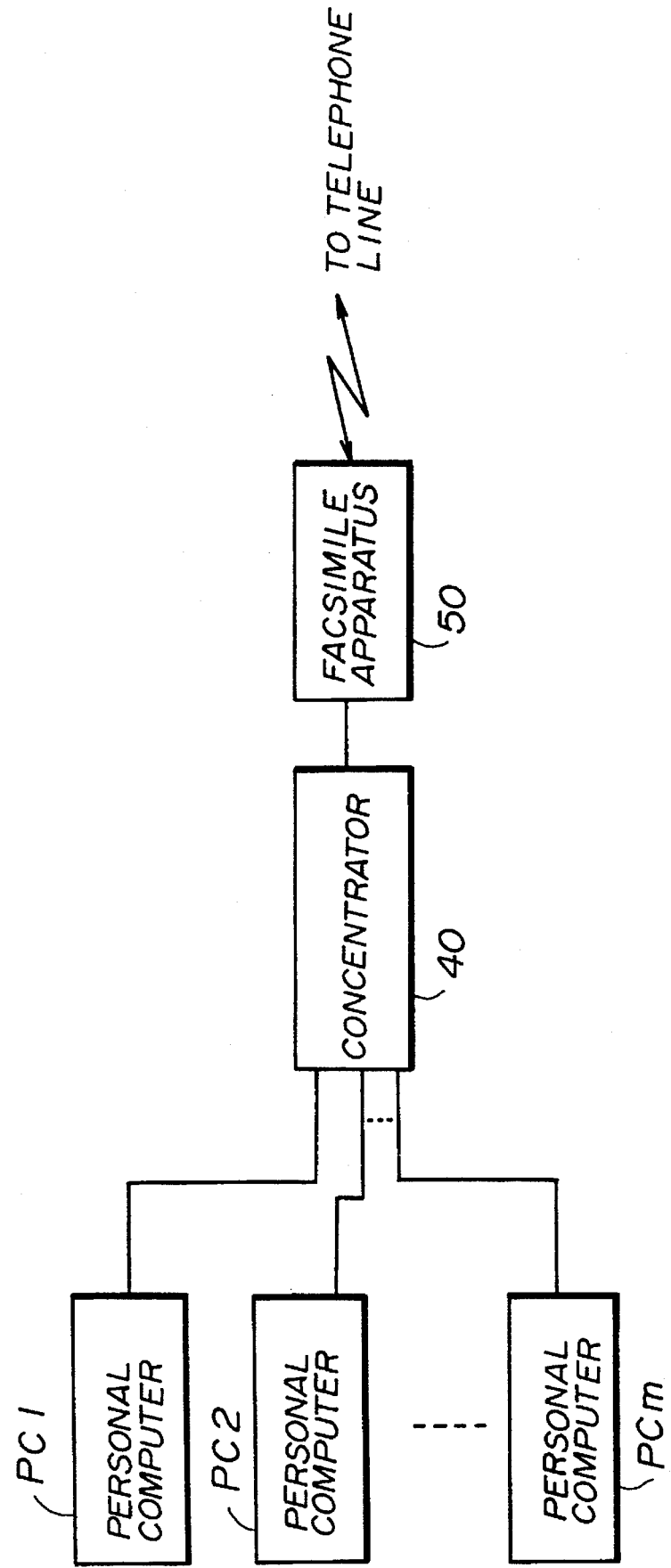
FIG. 1 is a block diagram showing a local area network system to which the present invention is applied.

FIG. 1 shows a local area network (LAN) system including a plurality of personal computers and a facsimile apparatus. In the local area network system in FIG. 1, a facsimile apparatus 50, which can operate as a facsimile server for a plurality of personal computers on a local area network, is linked to a concentrator 40. The concentrator 40 in turn is linked to each of "m" personal computers PC1, PC2, . . . , PCm. Thus, the "m" personal computers are connected to the facsimile apparatus 50 via the concentrator 40. The facsimile apparatus 50 is connected to an external network when data is transmitted to the external network or received from the external network. Thus, any user on the "m" personal computers can transmit and receive data by using the facsimile apparatus 50.

The concentrator 40 is a kind that arranges local area network terminals like a star. For example, 10BASE-T in conformity with IEEE 802.3 CSMA/CD may be used as the concentrator 40. Control processing and application programs on the personal computers PC1 through PCm and of the facsimile apparatus 50 are based on a multi-window network operating system.

Figure 2:
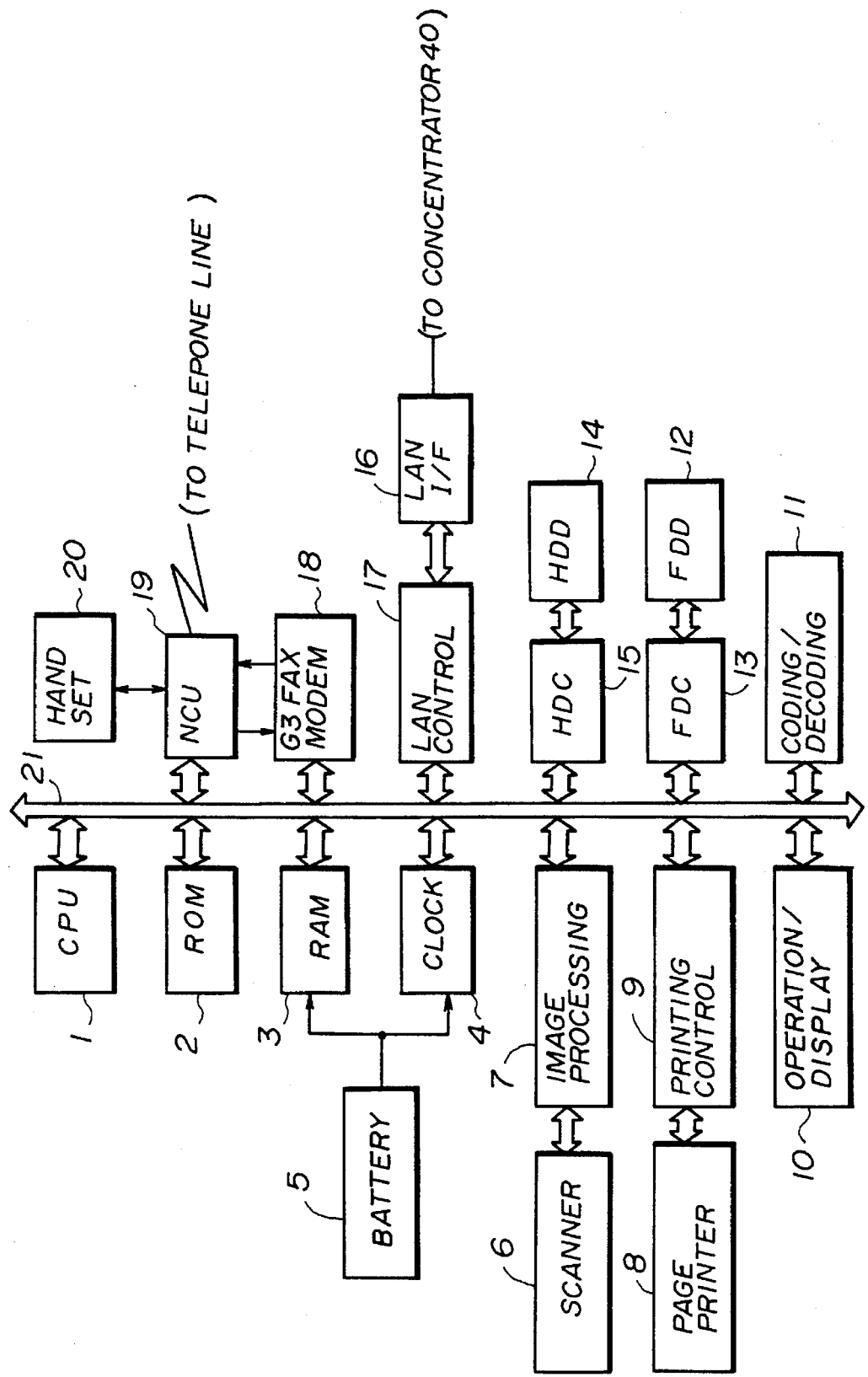
FIG. 2 is a block diagram showing a facsimile apparatus of the local area network system in FIG. 1.

FIG. 2 shows a facsimile apparatus in the local area network system in FIG. 1. In FIG. 2, the facsimile apparatus comprises a CPU (central processing unit) 1, a ROM (read only memory) 2, a RAM (random access memory) 3, a clock unit 4, a battery 5, a scanner unit 6, an image processing unit 7, a page printer 8, a printing control unit 9, and an operation/display unit 10.

The CPU 1 controls operation of the component units of the facsimile apparatus, and carries out various CCITT group-3 (G3) facsimile transmission procedures and various facsimile server functions. The ROM 2 stores critical programs for the CPU 1 to carry out the above procedures and functions, and stores various parameters used in the programs. The RAM 3 provides the CPU 1 with a main memory and various work areas which are used when the above procedures and functions are carried out. The clock unit 4 outputs a signal indicative of the current time. As the RAM 3 and the clock unit 4 are coupled to the battery 5, the data of the RAM 3 is maintained and the clock unit 4 continuously outputs the signal even when the facsimile apparatus is OFF.

The scanner unit 6 scans a document to read out an image at a given resolution. The image processing unit 7 controls the operation of the scanner unit 6, and processes the read image of the scanner unit 6 to output image signals.

The page printer 8 is, for example, a laser beam printer which prints an image on plain paper at a high resolution with good picture quality. The printing control unit 9 controls the printing operation of the page printer 8.

The operation/display unit 10 includes a set of character keys, numeric key and control keys, and various display areas. The keys and the display areas of the operation/display unit 10 is used by a user on the facsimile apparatus to locally control the operation of the facsimile apparatus.

In FIG. 2, the facsimile apparatus further comprises a coding/decoding unit 11, a FDD (floppy disk drive) unit 12, a FDC (floppy disk drive control) unit 13, a HDD (hard disk drive) unit 14, a HDC (hard disk drive control) unit 15, a LAN I/F (local area network interface) unit 16, a LAN control unit 17, a G3 FAX modem 18, a NCU (network control unit) 19, and a hand set 20.

The coding/decoding unit 11 performs a prescribed encoding procedure to provide the data compression for transmitting image signals, and performs a prescribed decoding procedure to provide the data decompression for reconstructing received image signals into the original image signals. The FDD unit 12 carries out the data recording, the data reproducing, and the editing for data on a floppy disk. The FDC unit 13 controls the operation of the FDD unit 12.

The HDD unit 14 is a magnetic storage device with a large storage capacity for storing information. Various files, including operating system files, application program files, and document files, are stored in the HDD unit 14. These files stored in the HDD unit 14 are always usable in the facsimile apparatus. The HDC unit 15 controls the operation of the HDD unit 14.

The LAN I/F unit 16 is an interface circuit for connecting the facsimile apparatus 50 to the concentrator 40. The LAN control unit 17 is a control unit for carrying out data transmission in accordance with a prescribed LAN protocol.

The G3 FAX modem 18 is a modem unit which realizes the G3 facsimile modem functions. It has a function of sending and receiving protocol signals at a low speed in conformity with the CCITT V.21 protocol, and has a function of sending and receiving image signals at higher speeds in accordance with the CCITT V.33, V.29 or V.27ter protocol.

The NCU 19 is a control unit for connecting the facsimile apparatus to an external network or a public telephone line.

The NCU 19 is provided with an automatic transmission/reception function. The hand set 20 is attached to the NCU 19, and it is used for voice communication.

The CPU 1, the ROM 2, the RAM 3, the clock unit 4, the image processing unit 7, the printing control unit 9, the operation/display unit 10, the coding/encoding unit 11, the FDC unit 13, the HDC unit 15, the LAN control unit 17, the G3 FAX modem 18, and the NCU 19 are interconnected by a system bus 21. Data is primarily transferred from one of the above mentioned elements to another via the system bus 21.

Next, a description will be given, with reference to FIGS. 3A through 10, of a first embodiment of the facsimile apparatus according to the present invention. In the first embodiment, lists of user management data shown in FIGS. 3A through 3E are utilized.

FIG. 3A shows a list of a user record used in the first embodiment. The respective user records for the users on the personal computers PC1 through PCm are produced in the log-in procedures and stored to manage the facsimile usage records of the users on the personal computers.

The user record in FIG. 3A includes a user name, a password, an authorization attribute, and a previous log-out record. The user name indicates the identification of an user who begins a computer session. The password is used to confirm the identification of the user who has entered the user name. The authorization attribute indicates whether the user is an authorized operator of the LAN system or an unauthorized operator. The previous log-out record indicates the date and time of the previous log out.

FIG. 3B shows lists of transmission result records used in the first embodiment. The lists of transmission result records are stored in a prescribed region of the RAM 3. The prescribed region of the RAM 3 is divided into two areas: a specified user area in which the transmission result record lists for specified users are stored; and an unspecified user area in which the transmission result record lists for unspecified users are stored. The specified users are the users who were able to be recognized with the user name and password specified, and the unspecified users are the users who were unable to be recognized because the user name was not specified.

FIG. 3C shows a list of transmission result records for each of the specified users, stored in the specified user area of the RAM 3. The list of transmission result records in FIG. 3C includes a file number, the number of pages, a date/time, a required time, a charge amount, a user name, a destination terminal list, a transmission mode, a transmission result, and a deletion flag. The file number indicates a file identification value assigned to each of documents transmitted or received. The number of pages indicates the quantity of a document transmitted or received. The date/time indicates the date and time of transmission or reception of a document. The required time indicates the time required for transmission or reception. The charge amount indicates the amount of a charge for transmission. The user name indicates the identification of the user who is specified at the start of the transmission. The destination station list indicates at least one of a destination station identification number and its telephone number. The transmission mode indicates whether the computer session is a transmission or a reception. The transmission result indicates whether the result of the transmission is successful, unsuccessful, or a waiting condition.

FIG. 3D shows a list of transmission result records for one of the unspecified users, stored in the unspecified user area of the RAM 3. The list of transmission result records in FIG. 3D includes the file number, the number of pages, the date/time, the required time, the charge amount, the destination station list, the transmission mode, the transmission result, and the deletion flag.

FIG. 3E shows a list of an error message used in the first embodiment. This list is also stored in the facsimile apparatus in order to provide the user with the operation guidance data for eliminating an error state of the facsimile apparatus due to a paper jam, a paper end or the like. The error message list in FIG. 3E includes an error code, and an error eliminating operation guidance. The error code indicates the kind of an error occurred in the facsimile apparatus. The error eliminating operation guidance may be text data including characters only, or composite data including characters and images. The error eliminating operation guidance provides the user with an operation guidance for eliminating the error state of the facsimile apparatus.

Figure 4:
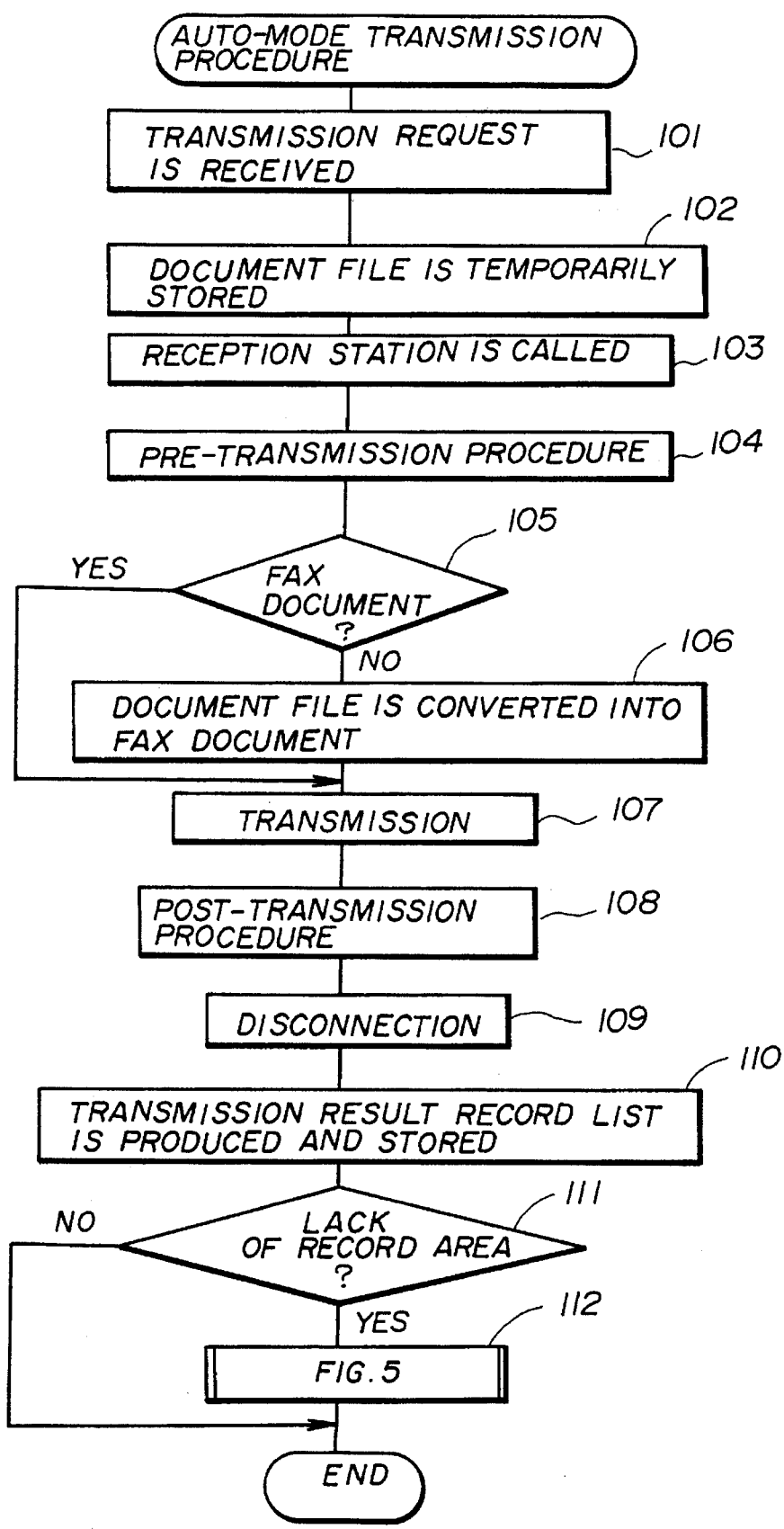
FIG. 4 is a flow diagram for explaining an auto-mode transmission procedure in the first embodiment.

FIG. 4 shows an auto-mode transmission procedure in the first embodiment. In this procedure, the user on one of the personal computers PC1 through PCm of the local area network transfers a document file to the facsimile apparatus 50 via the concentrator 40, and makes the facsimile apparatus 50 transmit the document file over the telephone line. As shown in FIGS. 1 and 2, the facsimile apparatus 50 includes a unit for transmitting a document file to the telephone line in response to a transmission request from the one of the personal computers of the local area network.

At step 101 in the auto-mode transmission procedure in FIG. 4, the facsimile apparatus receives a transmission request issued from one of the personal computers PC1 through PCm. A reception station to which a document is to be transmitted is indicated by the transmission request. Step 102 receives a document file transferred from the personal computer which has issued the transmission request, and temporarily stores the received document file in the HDD unit 14.

Step 103 calls the reception station, which is indicated by the transmission request, over a telephone line. After a response from the reception station is received, step 104 performs a pre-transmission procedure to establish a transport connection between the facsimile apparatus and the reception station over the telephone line. A specific communication function of the facsimile apparatus used in the computer session with the reception station is set at step 104.

Step 105 detects whether or not the received document from the source personal computer is a facsimile document. When the result at step 105 is negative, step 106 is performed. Step 106 converts the received document into a facsimile document and temporarily stores the facsimile document in the HDD unit 14. When the result at step 105 is affirmative, step 107 is performed and the above step 106 is not performed.

Step 107 transmits the facsimile document, which is temporarily stored in the facsimile apparatus, to the reception station over the telephone line. After the document is transmitted to the reception station over the telephone line, step 108 performs a post-transmission procedure. Step 109 performs a transport connection releasing procedure to disconnect the facsimile apparatus from the telephone line.

Figure 5:
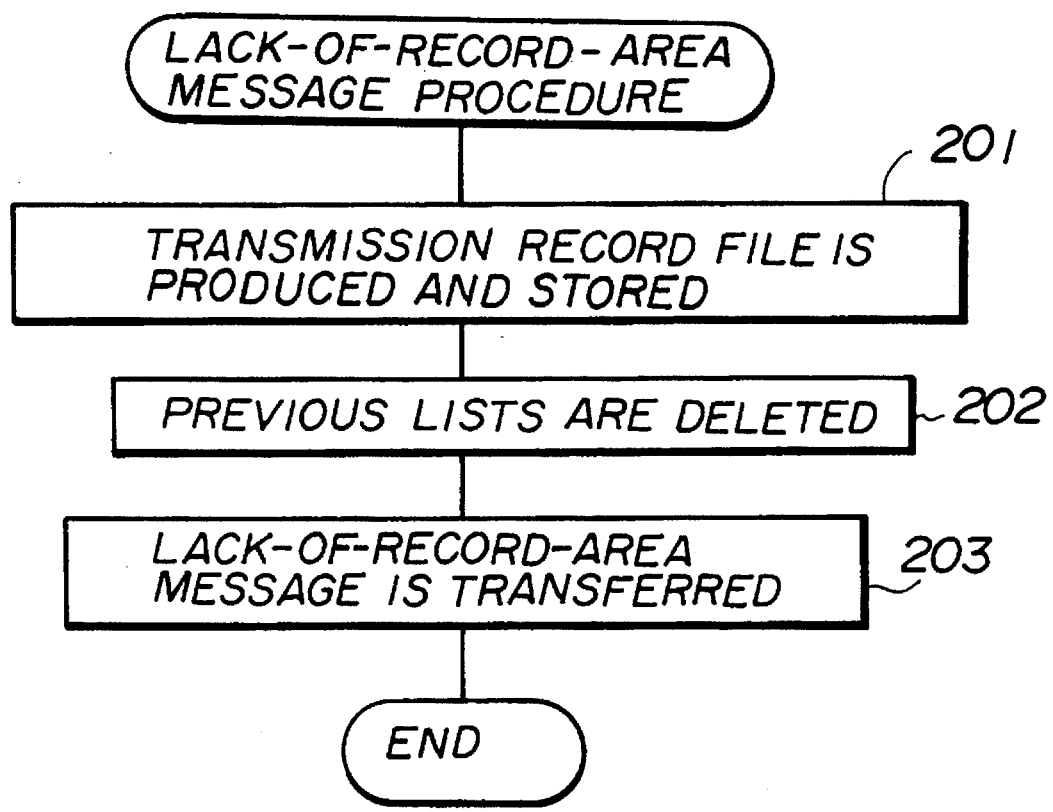
FIG. 5 is a flow diagram for explaining a lack-of-record-area message procedure in the facsimile server transmission procedure in FIG. 4.

After the data transmission steps 103 through 109 are completed, step 110 produces a list of transmission result records with respect to that session, and stores the list in the specified user area of the RAM 3. Step 111 detects whether or not the specified user area or the unspecified user area of the RAM 3 is full of the previous transmission result record lists. When the result at step 111 is affirmative, the transmission result record lists, produced at step 110, was not able to be stored in the RAM 3. Step 112 performs a lack-of-record-area message procedure which is shown in FIG. 5. After the procedure in FIG. 5 is performed, a message, which informs an authorized operator of the lack-of-record-area state of the RAM 3, is supplied. After the step 112 is performed, the auto-mode transmission procedure in FIG. 4 ends.

On the other hand, when the result at step 111 is negative, the above step 112 is not performed and the auto-mode transmission procedure in FIG. 4 ends.

FIG. 5 shows the lack-of-record-area message procedure performed within the auto-mode transmission procedure in FIG. 4. At the start of this procedure, the specified user area (or the unspecified user area) of the RAM 3 is full of the previous transmission result record lists. Step 201 produces a transmission record file to which the contents of the specified user area of the RAM 3 and the contents of the unspecified user area of the RAM 3 are transferred. Also, step 201 stores the transmission record file in a prescribed area of the HDD unit 14 by attaching a suitable file name to the transmission record file.

After the above step 201 is performed, step 202 deletes all the previous lists in the specified user area (or the unspecified user area) of the RAM 3. Consequently, the previous transmission result record lists in the RAM 3 are restored to the transmission record file in the HDD unit 14, and the specified user area (or the unspecified user area) of the RAM 3 is initialized. When the transmission result record lists are deleted, the deletion flags thereof are turned on. Conversely, when new transmission result record lists are produced, the deletion flags thereof are turned off.

After the above step 202 is performed, step 203 produces a lack-of-record-area message, which informs an authorized operator of the lack-of-record-area state of the RAM 3, and transfers the lack-of-record-area message to a prescribed reception station, which is one of the personal computers PC1 through PCm in the LAN. It is necessary that, on the reception station, the user (or the authorized operator) has already performed a log-in procedure. Also, step 203 displays the lack-of-record-area message on the monitor of the reception station, so as to draw the attention of the authorized operator to the message.

In the first embodiment described above, when the specified user area or the unspecified user area of the RAM 3 is detected to be full of the previous transmission result record lists, a transmission record file containing the previous transmission result record lists is produced and stored in the HDD unit 14. An authorized operator on one of the personal computers in the LAN can easily edit this file to a suitable format and can copy it to a floppy disk on the FDD unit 12. Thus, the users on the personal computers in the LAN can efficiently manage the transmission result records of the facsimile apparatus.

In the auto-mode transmission procedure described above, when a transmission request from one of the personal computers is received, a list of transmission result records for the user on the requesting personal computer is produced and stored. Thus, the users on the personal computers in the LAN can efficiently manage the transmission result records of the facsimile apparatus.

Figure 6:
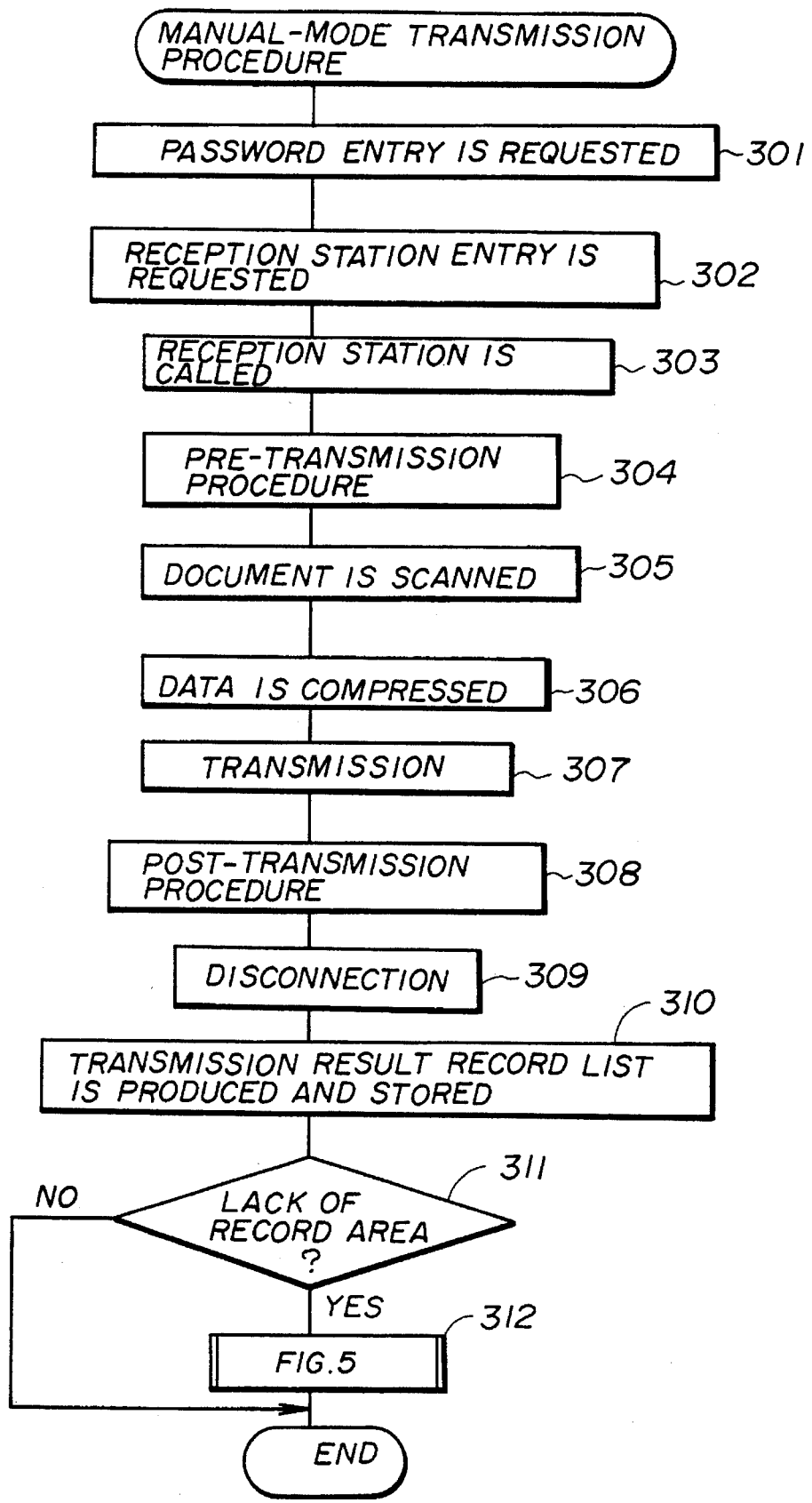
FIG. 6 is a flow diagram for explaining a manual-mode transmission procedure in the first embodiment.

FIG. 6 shows a manual-mode transmission procedure in the first embodiment. In this procedure, a document is set to the scanner unit 6 of the facsimile apparatus, and the user on one of the personal computers issues a transmission request to the facsimile apparatus. Herein, the personal computer on which the user has issued a transmission request is called the source station.

At step 301 in the manual-mode transmission procedure in FIG. 6, the facsimile apparatus requests that the user enters the password on the source station. The facsimile apparatus receives the entered password from the source station. Step 302 requests that the user enters an identification of a reception station to which the document is to be transmitted. The facsimile apparatus receives the identification of the reception station from the source station.

Step 303 calls the reception station over a telephone line by using the identification of the reception station. After a response from the reception station is received, step 304 performs a pre-transmission procedure to establish a transport connection between the facsimile apparatus and the reception station over the telephone line. A specific communication function of the facsimile apparatus used in the computer session with the reception station is set at step 304.

Step 305 controls the scanner unit 6 to read an image from the document. The read image is processed by the image processing unit 7, and image signals from the image processing unit 7 are transferred to the coding/decoding unit 11. Step 306 controls the coding/decoding unit 11 to provide the data compression for transmitting image signals. The coding/decoding unit 11 supplies compressed image data which indicates the document image.

Step 307 transmits the image data, which is supplied from the coding/decoding unit 11, to the reception station over the telephone line. After the image data is transmitted to the reception station over the telephone line, step 308 performs a post-transmission procedure. Step 309 performs a transport connection releasing procedure to disconnect the facsimile apparatus from the telephone line.

After the data transmission steps 303 through 309 are completed, step 310 produces a list of transmission result records with respect to that session by using the user name obtained from the entered password (step 301), and stores the transmission result record list in the specified user area of the RAM 3.

Similarly to the procedure in FIG. 4, step 311 detects whether or not the specified user area or the unspecified user area of the RAM 3 is full of the previous transmission result record lists. When the result at step 311 is affirmative, step 312 performs the lack-of-record-area message procedure shown in FIG. 5. After the procedure in FIG. 5 is performed, a message, which informs an authorized operator of the lack-of-record-area state of the RAM 3, is supplied. After the step 312 is performed, the transmission procedure in FIG. 6 ends. On the other hand, when the result at step 311 is negative, the above step 312 is not performed and the procedure in FIG. 6 ends.

In the manual-mode transmission procedure described above, when a transmission of a document on the facsimile apparatus is requested from the user on one of the personal computers, the entry of the password is requested and a transmission result record list for the user indicated by the password is produced and stored. Thus, the users on the personal computers in the LAN can efficiently manage the transmission result records of the facsimile apparatus.

Figure 7:
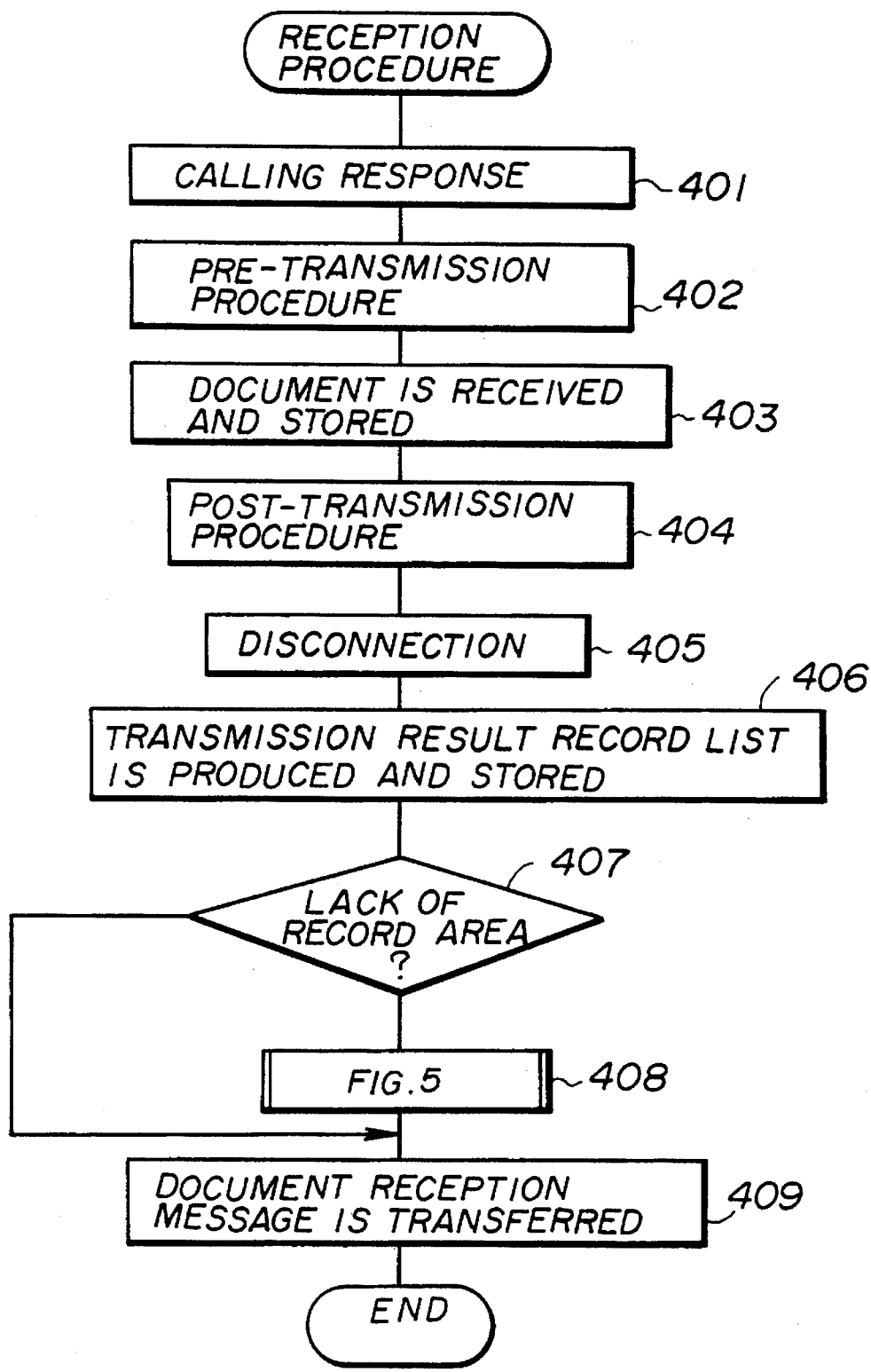
FIG. 7 is a flow diagram for explaining a reception procedure in the first embodiment.

FIG. 7 shows a reception procedure in the first embodiment. In this procedure, a document from an external station is received on the facsimile apparatus, and the reception of the document is notified to the user on a prescribed reception station, which is one of the personal computers in the LAN. As shown in FIGS. 1 and 2, the facsimile apparatus includes a unit for receiving a document file, addressed to a specific one of the personal computers PC1 through PCm of the local area network, from a telephone line. Herein, an external station from which a document is received on the facsimile apparatus is called the source station.

At step 401 in the reception procedure in FIG. 7, the facsimile apparatus sends a response to the source station over a telephone line after a calling signal from the source station has been received on the facsimile apparatus.

Step 402 performs a pre-transmission procedure to establish a transport connection between the facsimile apparatus and the source station over the telephone line. A specific communication function used in the computer session between the facsimile apparatus and the source station is set at step 402.

Step 403 controls the G3 FAX modem 18 and the NCU 19 to receive the document from the source station over the telephone line, and stores the document in the HDD unit 14 in the form of a document file. Step 404 performs a post-transmission procedure. Step 405 performs a transport connection releasing procedure to disconnect the facsimile apparatus from the telephone line.

After the data reception steps 401 through 495 are completed, step 406 produces a list of transmission result records with respect to that session. At this step, when a communication protocol signal NSS received from the source station indicates a user name, the transmission result record list, as shown in FIG. 3C, is produced by using the user name, and the list is stored in the specified user area of the RAM 3. On the other hand, when the communication protocol signal NSS does not indicate a user name, the transmission result record list, as shown in FIG. 3D, is produced, and the list is stored in the unspecified user area of the RAM 3 at step 406.

Step 407 detects whether or not the specified user area or the unspecified user area of the RAM 3 is full of the previous transmission result record lists. When the result at step 407 is affirmative, step 408 performs the lack-of-record-area message procedure shown in FIG. 5. After the procedure in FIG. 5 is performed, a message informing an authorized operator of the lack-of-record-area state of the RAM 3, is supplied. After the step 408 is performed, step 409 transfers a document reception message, which informs of the reception of the document, to a destination station that is one of the personal computers PC1 through PCm. On the other hand, when the result at step 407 is negative, the above step 408 is not performed and the above step 409 is performed.

At the above step 409, when the communication protocol signal NSS from the source station indicates a user name, the document reception message is transferred to a reception station (one of the personal computers PC1 through PCm) of the user specified by the NSS signal. It is necessary that the user has already performed a log-in procedure on the reception station. When the signal NSS does not indicate a user name, the document reception message is transferred to a prescribed reception station of an authorized operator. It is necessary that the authorized operator has already performed a log-in procedure on the reception station.

In addition, when the user who received a document reception message on the personal computer issues a print request to the facsimile apparatus by specifying the file number, the document can be printed out from the page printer 8.

In the reception procedure described above, when the reception of a document from an external station is requested and a user name is specified, a list of transmission result records for the specified user is produced and stored in the specified user area of the memory. When the reception of a document from an external station is requested and no user name is specified, a list of transmission result records is produced and stored in the unspecified area of the memory. Thus, the users on the personal computers in the LAN can efficiently manage the transmission result records of the facsimile apparatus.

Figure 8:
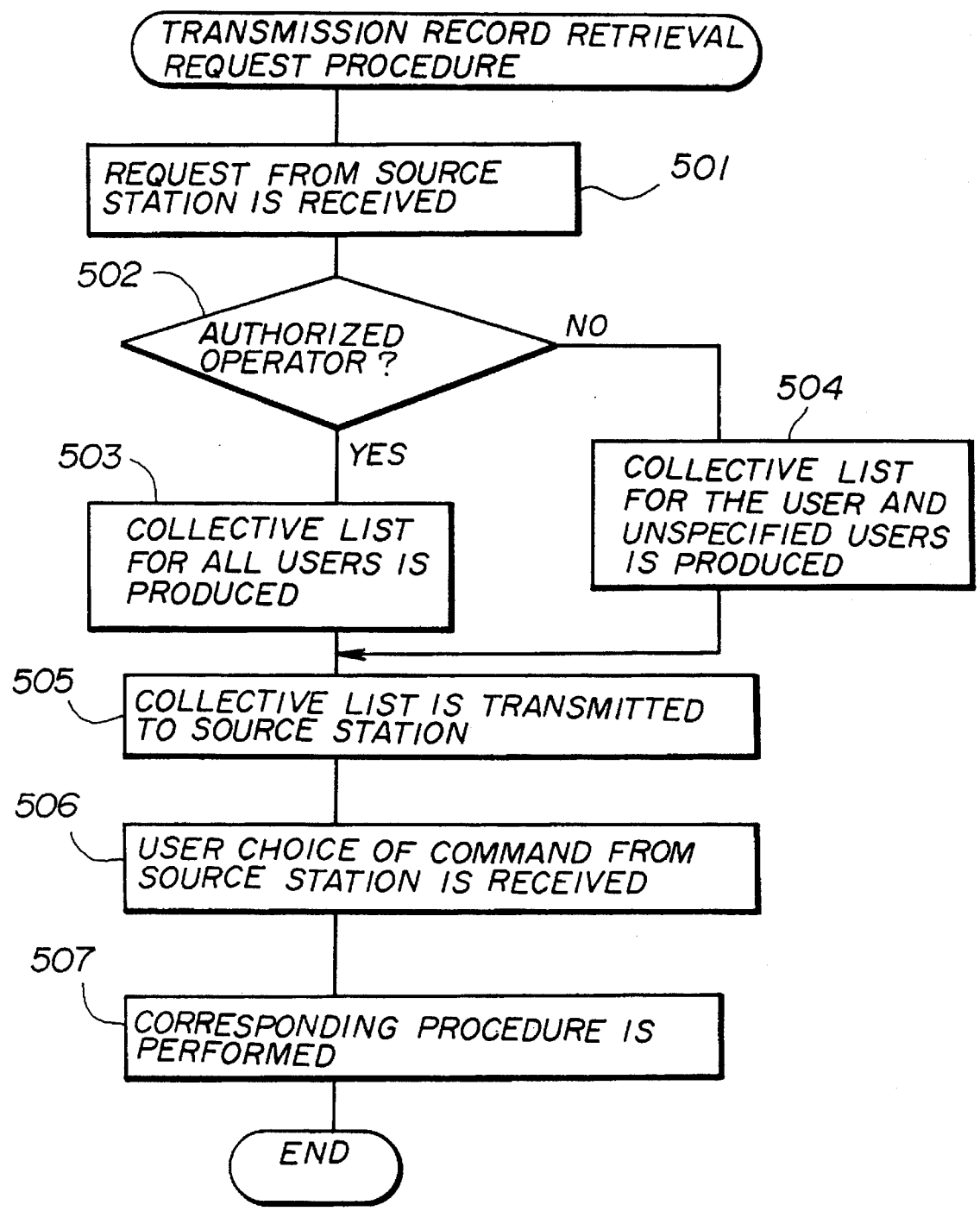
FIG. 8 is a flow diagram for explaining a transmission record retrieval request procedure in the first embodiment.

FIG. 8 shows a transmission record retrieval request procedure in the first embodiment. In this procedure, a transmission record retrieval request from one of the personal computers is issued to the facsimile apparatus, and requested information is supplied to the personal computer.

At step 501 of the procedure in FIG. 8, the facsimile apparatus receives a transmission record retrieval request issued from one of the personal computers PC1 through PCm. Herein, the personal computer on which the user has issued the request is called the source station.

Step 502 detects whether or not the user who has issued the request is an authorized operator. This can be detected based on the user record list of the user, as shown in FIG. 3A, which list is stored in the log-in procedure.

When the result at step 502 is affirmative, an authorized operator has issued the transmission record retrieval request. Step 503 produces a collective list of transmission result record lists for all the specified users and for all the unspecified users, on the facsimile apparatus. When the result at step 502 is negative, an unauthorized operator has issued the transmission record retrieval request. Step 504 produces a collective list of the remaining transmission result records for the user (who has issued the request) and of the remaining transmission result records for all the unspecified users, on the facsimile apparatus.

Step 505 transmits the collective list, produced at step 503 or step 504, to the source station, from which the transmission record retrieval request is issued by the user. Also, step 505 displays the collective list on the monitor of the source station. After the step 505 is performed, the user can open an command list window on the monitor of the personal computer, the command list window including various optional commands to be selected by the user.

The optional commands are, for example, a delete command, a transfer command, a print command, a re-transmit command, and a quit command. The delete command is to delete a specific transmission result record in the collective list displayed on the monitor of the source station. The transfer command is to transfer a specific transmission result record in the collective list displayed. The print command is to print out the displayed collective list on the page printer. The re-transmit command is to re-transmit a collective list the transmission of which previously failed. The user can select any of these commands in the command list window on the monitor of the personal computer.

Step 506 receives the user's choice of the optional command from the source station. Step 507 performs a corresponding procedure of the selected command on the facsimile apparatus.

In the transmission record retrieval request procedure described above, when a transmission record retrieval request is issued by an authorized operator on one of the personal computers in the LAN, a collective list of transmission result record lists for all the users (specified and unspecified) is produced on the facsimile apparatus, and the collective list is transmitted to the source station of the authorized operator. When a transmission record retrieval request is issued by an unauthorized operator, a collective list of the transmission result records for the operator and of the transmission result records for all the unspecified users is produced on the facsimile apparatus, and the collective list is transmitted to the source station. Thus, the users on the personal computers in the LAN can efficiently manage the transmission result records of the facsimile apparatus.

Figure 9:
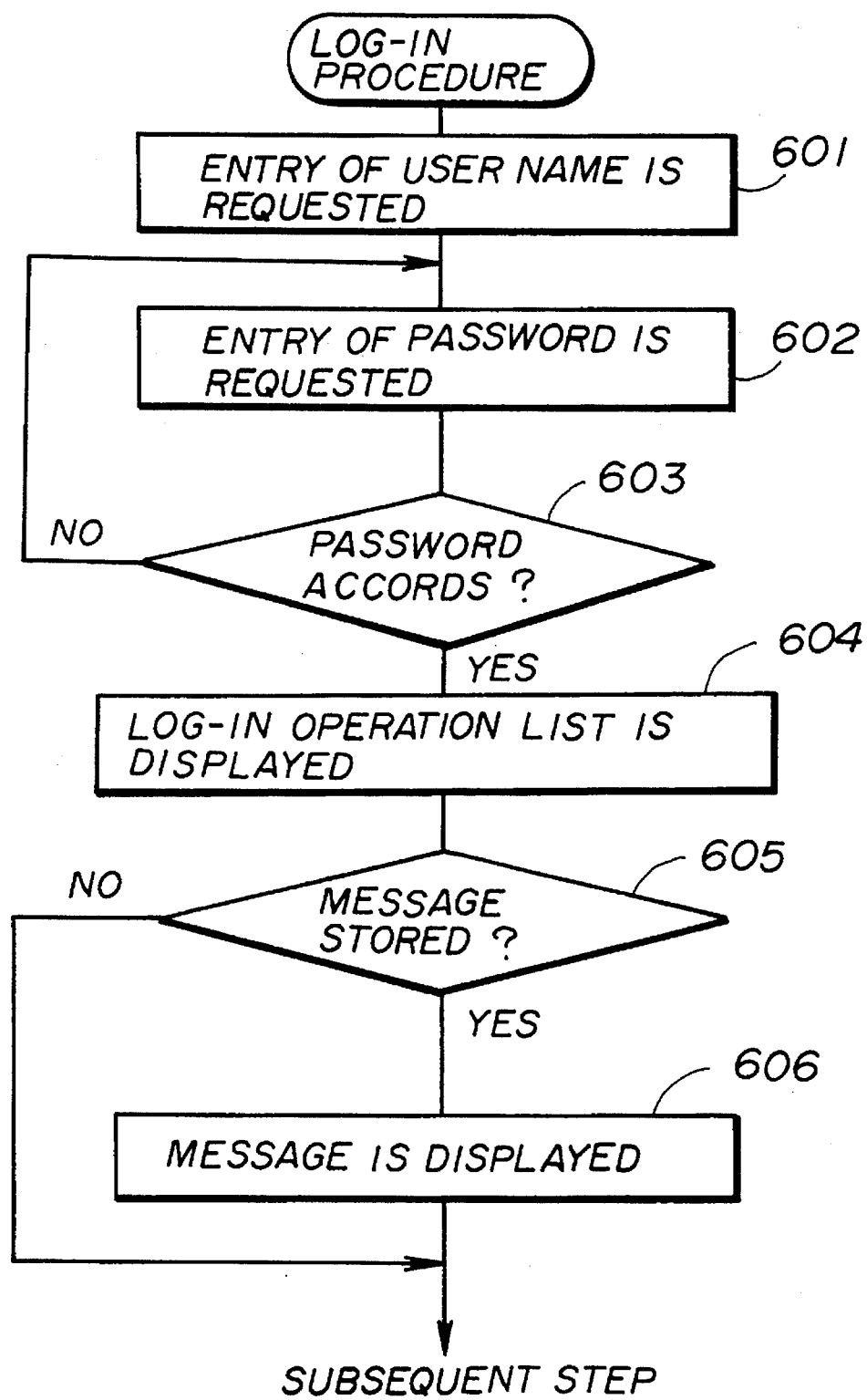
FIG. 9 is a flow diagram for explaining a log-in procedure in the first embodiment.

FIG. 9 shows a log-in procedure in the first embodiment. This procedure is performed to start a computer session between one personal computer and the facsimile apparatus. Herein, the personal computer on which the log-in procedure is performed is called the source station.

At step 601 in the log-in procedure in FIG. 9, the facsimile apparatus requests that the user enters the user name on the source station. The facsimile apparatus receives the entered user name from the source station. Step 602 requests that the user enters the password on the source station. The facsimile apparatus receives the entered password from the source station.

Step 603 detects whether or not the entered password accords with a pre-defined password. If the result at step 603 is negative, the above step 602 is repeated.

If the result at step 603 is affirmative, step 604 displays a log-in operation list on the monitor of the source station. Step 605 detects whether or not a message, addressed to any user, which has been received since the previous session, is stored in the facsimile apparatus. In a case in which the user is an authorized operator, the addressed message is, for example, a lack-of-record-area message or a document reception message. In a case in which the user is an unauthorized operator, the addressed message is, for example, a document reception message.

When the result at step 605 is affirmative, step 606 displays the message on the monitor of the source station. After the above step 606 is performed, a subsequent step is performed. On the other hand, when the result at step 605 is negative, the above step 606 is not performed and the subsequent step is performed.

Figure 10:
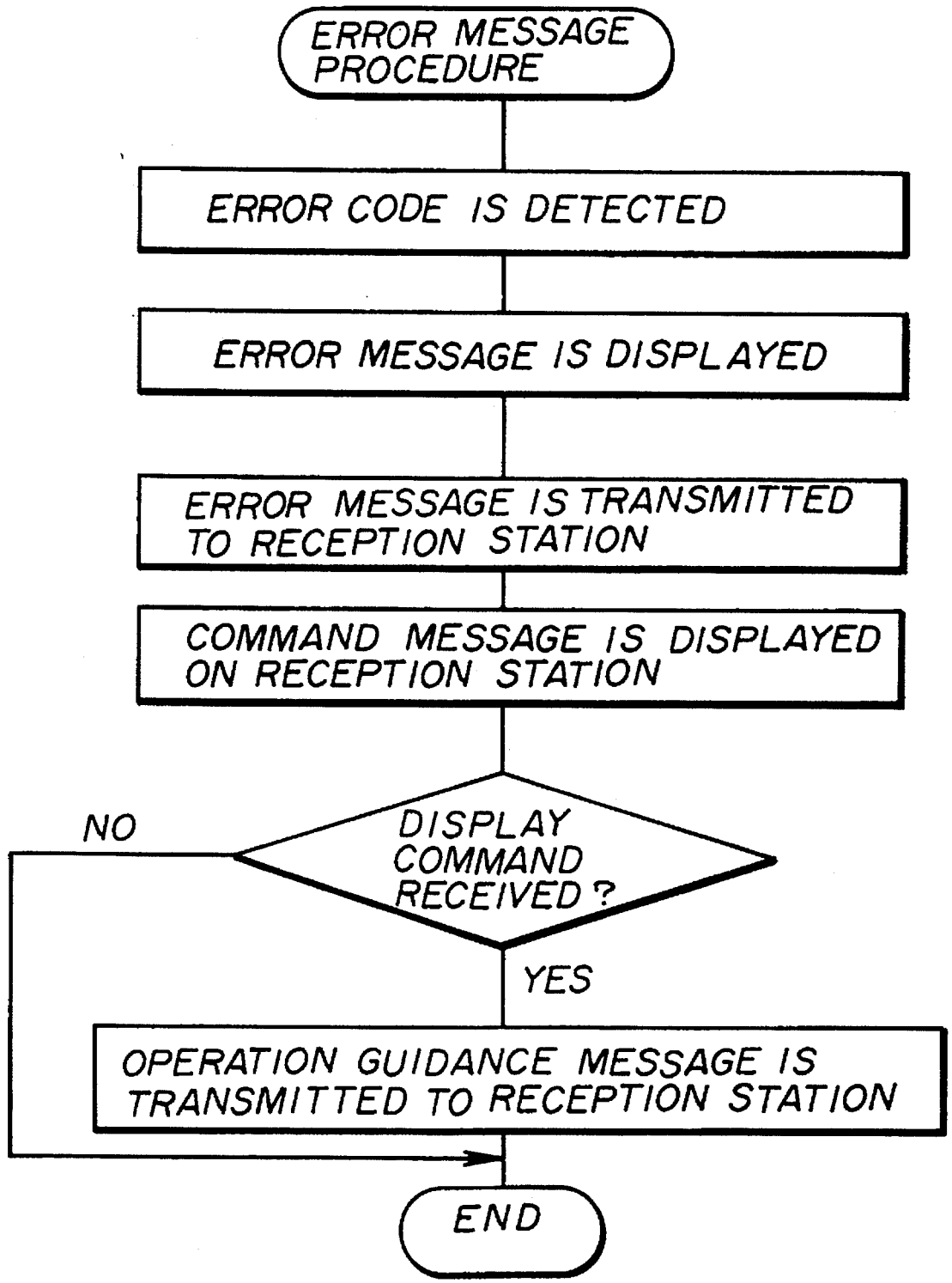
FIG. 10 is a flow diagram for explaining an error message procedure in the first embodiment.

FIG. 10 shows an error message procedure in the first embodiment. This procedure is performed when an error state of the facsimile apparatus due to a paper end, a paper jam or the like is detected.

At step 701 in the error message procedure in FIG. 10, the facsimile apparatus detects what kind of an error has occurred in the facsimile apparatus, based on the error code. Step 702 displays an error message, in which the error code is indicated, on the operation/display unit 10.

Step 703 transmits the error message to a prescribed reception station, which is one of the personal computers PC1 through PCm in the LAN. It is necessary that the user (or the authorized operator) has already performed a log-in procedure on the reception station.

Step 704 displays an operation guidance display command message on the reception station, which message informs the authorized operator that the entry of a display command is needed to display an error eliminating operation guidance on the reception station.

Step 705 detects whether or not a display command from the reception station is received. When the result at step 705 is affirmative, step 706 reads out the data of an error eliminating operation guidance from the RAM 3 based on the error code, produces an operation guidance message from the data, and transmits the operation guidance message to the reception station. After the above step 706 is performed, the error message procedure in FIG. 10 ends. On the other hand, when the result at step 705 is negative, the above step 706 is not performed and the error message procedure in FIG. 10 ends.

In the error message procedure described above, when an error state of the facsimile apparatus is detected, an error message from the facsimile apparatus is transmitted to and displayed on one of the personal computers in the LAN, and, if requested, an error eliminating operating guidance message is displayed on the monitor of the personal computer. Thus, the users on the personal computers in the LAN can efficiently manage the user management data of the facsimile apparatus.

Next, a description will be given, with reference to FIGS. 11A through 14, of a second embodiment of the facsimile apparatus according to the present invention. A facsimile apparatus in the second embodiment has the facsimile server functions and the print server functions. This facsimile apparatus is essentially the same as the facsimile apparatus in FIG. 2. A local area network system to which this facsimile apparatus is linked is the same as that of the first embodiment in FIG. 1. In the second embodiment, the users on the plurality of personal computers can efficiently use the print server functions by utilizing user management data.

In the second embodiment, lists of user management data shown in FIGS. 11A through 11E are utilized. FIG. 11A shows a list of a user record used in the second embodiment. This list is the same as the user record list shown in FIG. 3A. A description thereof will be omitted.

FIG. 11B shows a list of print-out records used in the second embodiment to manage print-out records of the facsimile apparatus for the users on the personal computers PC1 through PCm. The print-out record lists are stored in a print-out record area of the RAM 3. FIG. 11C shows a list of print-out records for each of the users on the personal computers PC1 through PCm. FIG. 11D shows a list of print-out file names. A plurality of the print-out record lists, as shown in FIG. 11C, and the print-out file name list in FIG. 11D are included in the print-out record lists in FIG. 11B.

The print-out record list in FIG. 11C includes a file name, the number of pages, a date/time, a user name, a print-out result, and an error code. The file number indicates an identification value assigned to each of the document files being printed. The number of pages indicates the quantity of a document file being printed. The date/time indicates the date and time of the printing of a document. The user name indicates the identification of a user who has issued a print request. The print-out result indicates whether the result of the printing is successful, unsuccessful, or a waiting condition. The error code indicates the kind of an error incurred in the facsimile apparatus during the printing.

The print-out file name list in FIG. 11D is a collection of file names the print-out files of which are arranged in the order of print requests.

FIG. 11E shows a list of an error message used in the second embodiment. An error in the facsimile apparatus occurs due to a paper end or a paper jam. An error message list is produced when an error state of the facsimile apparatus is detected. This list is stored in the facsimile apparatus in order to provide the user with the operation guidance data for eliminating the error state of the facsimile apparatus. The error message list in FIG. 11E includes an error code, and guidance for an error eliminating operation. The error code is the same as the error code in FIG. 11A, and indicates the kind of an error incurred in the course of the print-out. The error eliminating operation guidance may be text data including characters only, or composite data including characters and images. The error eliminating operation guidance provides the user with the guidance for an operation for eliminating the error state of the facsimile apparatus.

Figure 12:
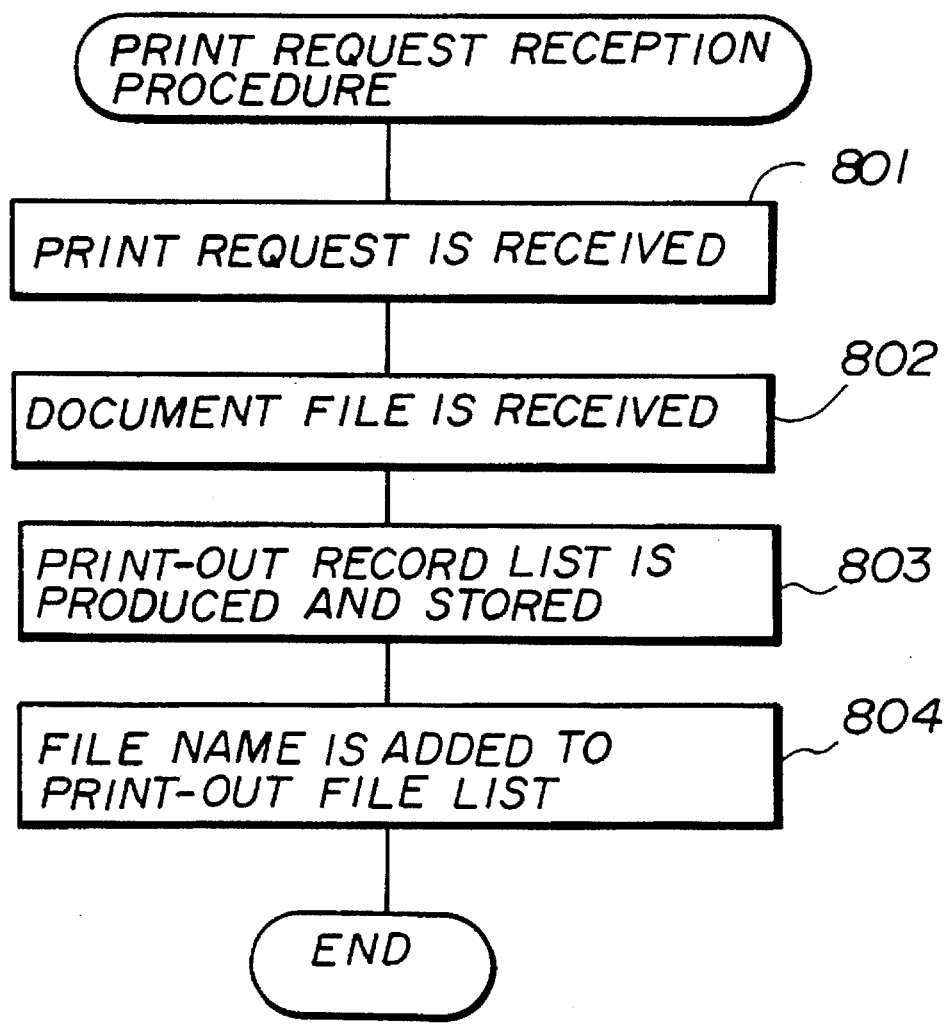
FIG. 12 is a flow diagram for explaining a print request reception procedure in the second embodiment.

FIG. 12 shows a print request reception procedure in the second embodiment. This procedure is performed when a print request from one of the personal computers PC1 through PCm is issued to the facsimile apparatus.

At step 801 in the print request reception procedure in FIG. 12, the facsimile apparatus 50 receives a print request issued from one of the personal computers PC1 through PCm in the LAN system. The facsimile apparatus sends a response to this print request, back to the personal computer. Herein, the personal computer from which the print request is issued to the facsimile apparatus is called the source station.

Step 802 receives a document file from the source station via the concentrator 40, and stores the document file in the facsimile apparatus. Step 803 produces a print-out record list, as shown in FIG. 11C, and stores the print-out record list in the facsimile apparatus. Some items of the print-out record list are blank at this time. Step 804 adds the file name, assigned to the received document file, to the print-out file list, as shown in FIG. 11D. After the step 804 is performed, the print request reception procedure in FIG. 12 ends.

Figure 13:
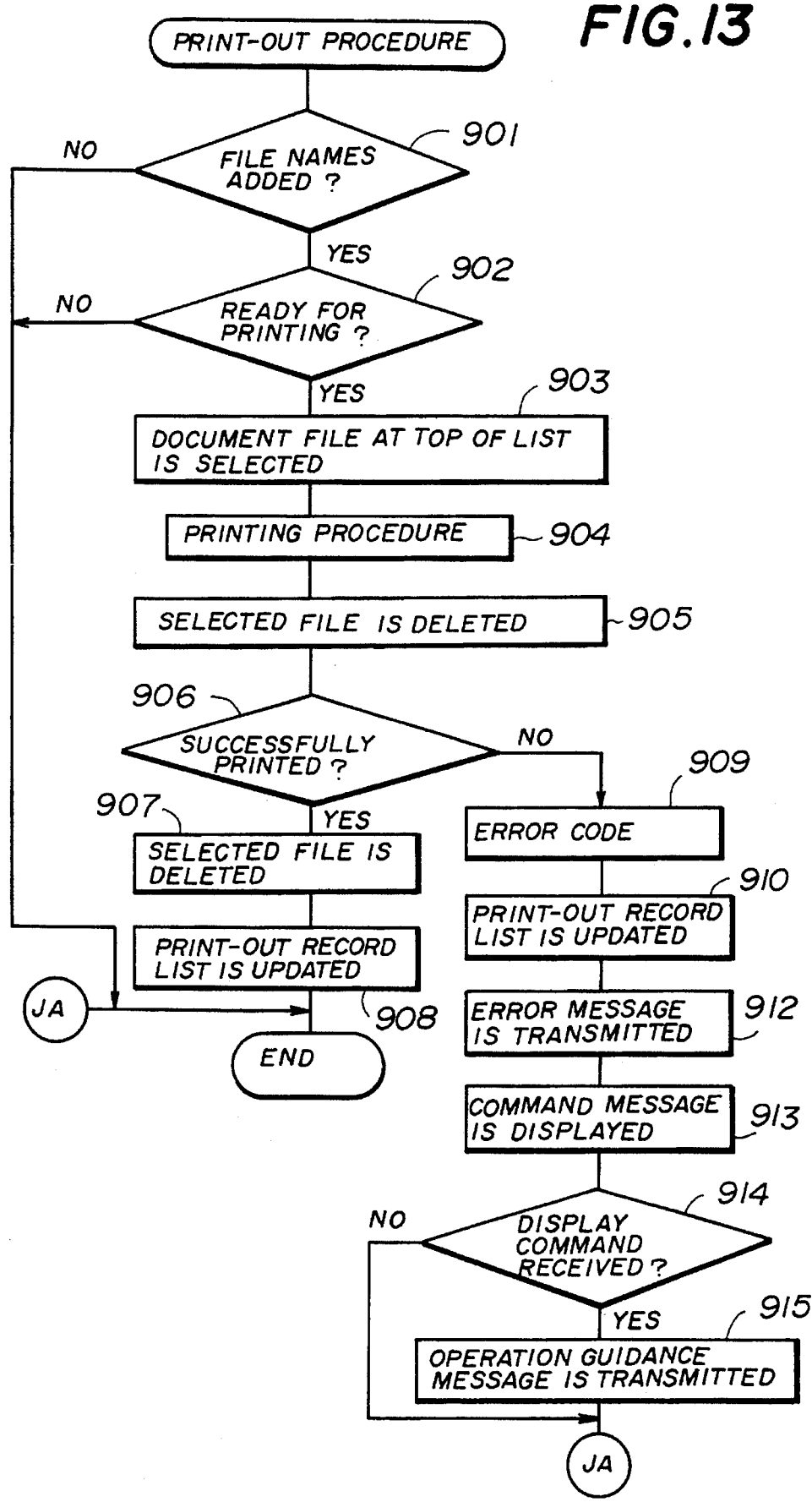
FIG. 13 is a flow diagram for explaining a print server procedure in the second embodiment.

FIG. 13 shows a print-out procedure in the second embodiment. In this procedure, document files, whose file names are added to the print-out file name list, are sequentially printed out by the facsimile apparatus in the order of the print requests. The printings of the document files are performed at given time intervals. Herein, the personal computer (one of the personal computers PC1 through PCm) from which a print request is issued to the facsimile apparatus is called the source station.

At step 901 in the print-out procedure in FIG. 13, the facsimile apparatus 50 detects whether or not one or more file names of document files are added to the print-out file name list. When the result at step 901 is affirmative, step 902 detects whether or not the facsimile apparatus is ready for printing.

When the result at step 901 is negative, or when the result at step 902 is negative, the print-out procedure in FIG. 13 ends.

When the result at step 902 is affirmative, step 903 selects a document file whose file name is at the top of the print-out file name list for subjecting the selected document file to printing. Step 904 controls the page printer 8 to perform a printing procedure of the selected document file in accordance with an application program. Step 905 deletes the file name of the selected document file in the print-out file name list. The result of printing, that is, whether the printing is done successfully or unsuccessfully or it is stopped in a waiting condition, is notified by the application program to the facsimile apparatus.

Step 906 detects whether or not the selected document file has been successfully printed. When the result at step 906 is affirmative, step 907 deletes the selected document file. Step 907 updates the print-out record list relating to the selected document file, in accordance with the result of the printing. Then, the print-out procedure in FIG. 13 ends.

When the result at step 906 is negative, step 909 detects what kind of an error has occurred, based on the error code. Step 910 updates the print-out record list relating to the selected document file by adding the error code to the list.

After the step 910 is performed, step 912 transmits an error message, which informs the user of the error state of the facsimile apparatus, to the source station (one of the personal computers PC1 through PCm), from which the print request is issued. Step 913 displays an operation guidance display command message on the source station, which message informs the user that the entry of a display command is needed to display an error eliminating operation guidance on the source station.

After the above step 913 is performed, step 914 detects whether or not a display command from the source station is received. When the result at step 914 is affirmative, step 915 reads out the data of an error eliminating operation guidance from the RAM 3 based on the error code, produces an operation guidance message from the data, and transmits the operation guidance message to the source station. After the above step 915 is performed, the print-out procedure in FIG. 13 ends. On the other hand, when the result at step 914 is negative, the step 915 is not performed and the print-out procedure in FIG. 13 ends.

In the print-out procedure described above, when a print request from a user on one of the personal computers is received, a print-out record list from the user is produced and stored in the facsimile apparatus. The user management data relating to the result of printing of a document file as requested, is added to the print-out record list. If a print-out record retrieval request is issued to the facsimile apparatus, the user on the source station can have access to the print-out record list. Thus, the users on the personal computers in the LAN can efficiently use the print server functions of the facsimile apparatus by utilizing the user management data.

Figure 14:
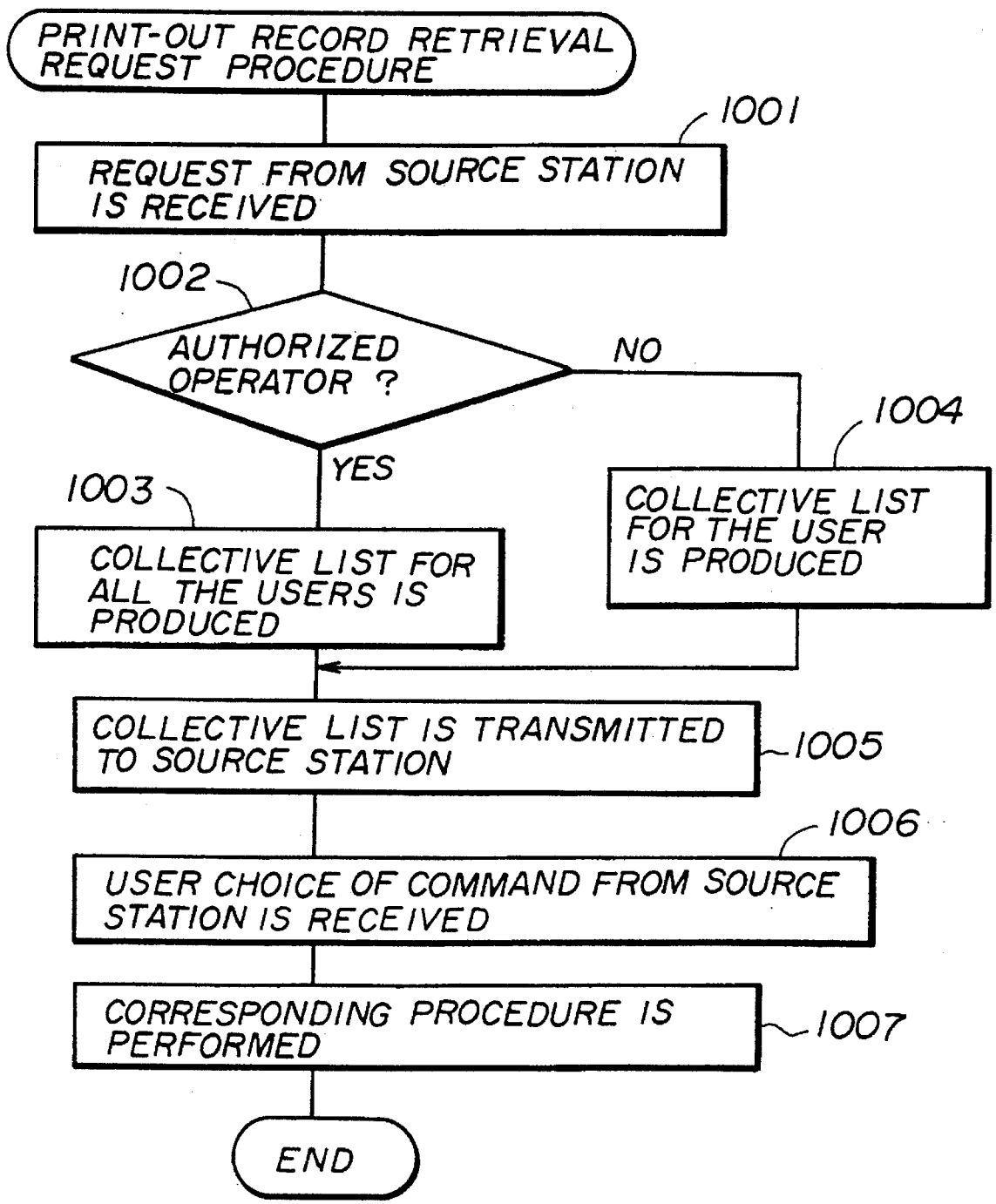
FIG. 14 is a flow diagram for explaining a print-out record retrieval request procedure in the second embodiment.

FIG. 14 shows a print-out record retrieval request procedure in the second embodiment. This procedure is performed when a print-out record retrieval request from one of the personal computers is issued to the facsimile apparatus. Herein, the personal computer from which the print-out record retrieval request is issued is called the source station.

At step 1001 in the print-out record retrieval request procedure in FIG. 14, the facsimile apparatus receives a print-out record retrieval request from the source station. Step 1002 detects whether or not the user of the source station is an authorized operator, based on the authorization attribute of the print-out record list.

When the result at step 1002 is affirmative, an authorized operator has issued the print-out record retrieval request. Step 1003 produces a collective list of print-out record lists for all the users on the facsimile apparatus.

When the result at step 1002 is negative, an unauthorized operator has issued the print-out record retrieval request. Step 1004 produces a collective list of the remaining print-out record lists for the user (who has issued the request) on the facsimile apparatus.

After the step 1003 or the step 1004 is performed, step 1005 transmits the collective list to the source station, from which the print-out record retrieval request is issued by the user. Also, step 1005 displays the collective list on the monitor of the source station.

After the collective list is displayed on the source station, the user can open a command list window on the monitor of the personal computer, the command list window including various optional commands to be selected by the user.

The optional commands are, for example, a print re-try command, a print cancel command, and a quit command. The print re-try command is to re-start a printing of a document file when the previous printing of the file has failed due to an error in the facsimile apparatus. The print cancel command is to cancel a printing of a document file when the previous printing of the file failed due to an error. The user can select any of these commands in the command list window on the monitor of the personal computer.

Step 1006 receives the user's choice of the optional command from the source station. Step 1007 performs a corresponding procedure of the selected optical command on the facsimile apparatus.

In the print-out record retrieval request procedure described above, when a print-out record retrieval request is issued by an authorized operator on one of the personal computers in the LAN, a collective list of print-out record lists for all the users is produced on the facsimile apparatus, and the collective list is transmitted to the source station of the authorized operator. When a print-out record retrieval request is issued by an unauthorized operator, a collective list of the print-out record lists for the operator is produced on the facsimile apparatus, and the collective list is transmitted to the source station. Thus, the users on the personal computers in the LAN can efficiently manage the print-out records of the facsimile apparatus.

The present invention is also applied to various local area network systems which are different from the local area network system shown in FIG. 1. The facsimile apparatus having CCITT G3 facsimile functions is used in the above described embodiments, but the present invention may be applied to a facsimile apparatus having CCITT G4 facsimile functions, linked to an integrated services digital network.

Further, the present invention is not limited to the above described embodiments, and variations and modifications may be made without departing from the scope of the present invention.

What is claimed is:

1. A facsimile apparatus which is linked to a local area network including a plurality of stations and operates as a facsimile server on the local area network, said facsimile apparatus comprising:

facsimile means for transmitting a document file to a communication line in response to a transmission request from one of the stations of the local area network, and for receiving a document file, addressed to one of the stations, from the communication line;

user record storage means for storing user record lists, each of which includes a user name record, a password record, and an authorization attribute record, the user name record identifying a user who has performed a log-in procedure on one of the stations, and the authorization attribute record indicating whether or not said user is an authorized operator;

transmission record storage means for storing first transmission result record lists for document files of specified users received or transmitted by said facsimile means, each of said first transmission result record lists being a set of first records with respect to one of the specified users, at least one of said first records being a user name identifying a specified user, and for storing second transmission result record lists for document files of unspecified users received or transmitted by said facsimile means, each of said second transmission result record lists being a set of second records with respect to one of the unspecified users; and control means, responsive to a retrieval request from a first user on one of said stations, for producing a collective list containing the first records for at least said first user stored in said transmission record storage means and containing the second records for all the unspecified users stored therein, and for transmitting the produced collective list to said one of said stations, on which the retrieval request has been issued by the first user, and for displaying the collective list on said one of said stations.

2. A facsimile apparatus according to claim 1, wherein the set of the first records in each of said first transmission result record lists, stored in said transmission record storage means, includes the user name, a file identifying number, a transmission mode, a date and time, and a transmission result, and the set of the second records in each of said second transmission result record lists, stored in said transmission record storage means, includes a file identifying number, a transmission mode, a date and time, and a transmission result.

3. A facsimile apparatus according to claim 1, further comprising:

means, responsive to a transmission request from a user on one of the stations, for requesting an entry of a password of the user on said one of said stations before a document file is transmitted to an external station; and means for producing a transmission result record list, including a user name corresponding to a user name record in a user record list of said user record storage means including a password record in accordance with said password, after the document file is transmitted to the external station, and for storing said produced transmission result record list in said transmission record storage means.

4. A facsimile apparatus according to claim 1, further comprising:

means for detecting whether or not said transmission record storage means is full of previous transmission result record lists when a new transmission result record list is stored in said transmission record storage means; and means for transmitting a message, which informs an authorized operator that said transmission result record storage means is lacking of a record area, to a prescribed station among the stations of the local area network when said transmission record storage means is detected to be full.

5. A facsimile apparatus according to claim 1, further comprising:

error message storage means for storing error message lists, each of which includes an error code and an operation guidance message, the error code indicating the kind of an error in the facsimile apparatus, and the operation guidance message including operation guidance data for allowing a user to eliminate an error state of the facsimile apparatus corresponding to the error code;

error detecting means for detecting an error state of the facsimile apparatus and for supplying an error code indicating said detected error state; and error message means for transmitting an error message, which informs an authorized operator of an error state of the facsimile apparatus, to a prescribed station among the stations of the local area network when the error state is detected by said error detecting means.

6. A facsimile apparatus which is linked to a local area network including a plurality of stations and operates as a facsimile server on the local area network, said facsimile apparatus comprising:

facsimile means for transmitting a document file to a communication line in response to a transmission request from one of the stations of the local area network, and for receiving a document file, addressed to one of the stations, from the communication line;

user record storage means for storing user record lists, each of which includes a user name record, a password record, and an authorization attribute record, the user name record identifying a user who has performed a log-in procedure on one of the stations, and the authorization attribute record indicating whether or not said user is an authorized operator;

transmission record storage means for storing first transmission result record lists for document files of specified users received or transmitted by said facsimile means, each of said first transmission result record lists being a set of first records with respect to one of the specified users, at least one of said first records being a user name identifying a specified user, and for storing second transmission result record lists for document files of unspecified users received or transmitted by said facsimile means, each of said second transmission result record lists being a set of second records with respect to one of the unspecified users;

first means, responsive to a retrieval request from a first user on one of said stations, for producing a collective list containing the first records for all the specified users stored in said transmission record storage means and containing the second records for all the unspecified users stored therein, when said first user is detected to be an authorized operator, and for producing a collective list containing the first records for said first user stored in said transmission record storage means and containing the second records for all the unspecified users stored therein, when said first user is detected to be an un-authorized operator; and second means for transmitting a collective list, produced by said first means, to said one of said stations, on which the retrieval request has been issued by said first user, and for displaying the collective list on said one of said stations.

7. A facsimile apparatus according to claim 6, wherein the set of the first records in each of said first transmission result record lists, stored in said transmission record storage means, includes the user name, a file identifying number, a transmission mode, a date and time, and a transmission result, and the set of the second records in each of said second transmission result record lists, stored in said transmission record storage means, includes a file identifying number, a transmission mode, a date and time, and a transmission result.

8. A facsimile apparatus according to claim 6, further comprising:

means for detecting whether or not said transmission record storage means is full of previous transmission result record lists when a new transmission result record list is stored in said transmission record storage means; and means for transmitting a message, which informs an authorized operator that said transmission result record storage means lacks a record storage area, to a prescribed station among the stations of the local area network when said transmission record storage means is detected to be full, a user on said prescribed station having performed a log-in procedure.

9. A facsimile apparatus according to claim 6, further comprising:

error message storage means for storing error message lists, each of which includes an error code and an operation guidance message, the error code indicating the kind of an error in the facsimile apparatus, and the operation guidance message including operation guidance data for allowing a user to eliminate an error state of the facsimile apparatus;

error detecting means for detecting an error state of the facsimile apparatus and for supplying an error code indicating said detected error state; and error message means for transmitting an error message, which informs an authorized operator of an error state of the facsimile apparatus, to a prescribed station among the stations of the local area network when the error state is detected by said error detecting means.

10. A facsimile apparatus according to claim 9, further comprising:

means for displaying an operation guidance display command message on the prescribed station, which message informs an authorized operator that a responsive entry of a display command is needed to display an operation guidance message on the prescribed station; and means for producing an operation guidance message by reading out the operation guidance data from said error message storage means when a display command from the prescribed station is received, and for displaying said operation guidance message on the prescribed station.

11. A facsimile apparatus which is linked to a local area network including a plurality of stations and operates as a print server on the local area network, said facsimile apparatus comprising:

printing means for printing a number of document files, whose file names are added to a file name list, in the order of print requests issued from the plurality of stations;

user record storage means for storing user record lists, each of which includes a user name record and an authorization attribute record, the user name record identifying a user who has performed a log-in procedure on one of the stations, and the authorization attribute record indicating whether or not said user is an authorized operator;

print-out record storage means for storing print-out record lists for document files, received from the stations, each of said print-out record lists being a set of print-out records with respect to one of the document files, at least one of said print-out records being a user name identifying a user on one of the stations; and control means, responsive to a retrieval request from a first user on a source station of said stations, for producing a collective list containing at least the print-out records for said first user stored in said print-out record storage means, and for transmitting the produced collective list to said source station, on which the retrieval request has been issued by the first user, and for displaying the collective list on said source station.

12. A facsimile apparatus according to claim 11, further comprising:

means for displaying a list of optional commands on said source station after the collective list is displayed thereon, which list informs the first user that a selection of an optional print command from the list is needed to perform an optional print operation; and means, responsive to a selection of an optional print command from said source station, for performing an optional print operation corresponding to the selected optional print command when the document files are printed by said printing means.

13. A facsimile apparatus according to claim 11, wherein said control means displays a collective list, containing only the print-out records for the first user stored in said print-out record storage means, on said source station when the first user is detected not to be an authorized operator, and wherein said control means displays a collective list, containing the print-out records for all the users stored in said print-out record storage means, on said source station when the first user is detected to be an authorized operator.

14. A facsimile apparatus according to claim 11, further comprising:

error message storage means for storing error message lists, each of which includes an error code and an operation guidance message, the error code indicating the kind of an error in the facsimile apparatus, and the operation guidance message including operation guidance data for allowing a user to eliminate an error state of the facsimile apparatus;

error detecting means for detecting an error state of the facsimile apparatus and for supplying an error code indicating said detected error state; and error message means for transmitting an error message, which informs an authorized operator of an error state of the facsimile apparatus, to a prescribed station among the stations of the local area network when the error state is detected by said error detecting means.

15. A facsimile apparatus according to claim 14, further comprising:

means for displaying an operation guidance display command message on the source station, which message informs an authorized operator that a display command response is needed to display an operation guidance message on the source station; and means for producing an operation guidance message by reading out the operation guidance data from said error message storage means when a display command from the source station is received, and for displaying said operation guidance message on the source station.

* * * * *